United States Patent [19]

Koyama

[11] Patent Number: 4,792,703

[45] Date of Patent: Dec. 20, 1988

[54] EARTHED CIRCUIT FOR AN ELECTRIC RAILWAY CAR

[75] Inventor: Shigeru Koyama, Hyogo, Japan

[73] Assignee: Mitsubishi Denki Kabushiki Kaisha, Tokyo, Japan

[21] Appl. No.: 915,715

[22] Filed: Oct. 6, 1986

[30] Foreign Application Priority Data

Oct. 30, 1985 [JP] Japan .................. 60-241307

[51] Int. Cl.$^4$ .............................................. H02J 7/34
[52] U.S. Cl. ................................. 307/14; 307/10 R; 307/9; 361/212; 361/217; 105/49
[58] Field of Search ................. 307/145, 147, 149, 9, 307/10 R; 104/130, 288, 289, 157; 105/49, 50, 53, 54, 77, 78, 140; 246/35, 42, 120, 121, 255, 219; 340/292; 361/212–228, 230, 231; 318/139, 345; 174/6, 7

[56] References Cited

U.S. PATENT DOCUMENTS

| | | | |
|---|---|---|---|
| 1,706,765 | 3/1929 | Arden | 105/49 |
| 1,754,505 | 4/1930 | Ellis | 105/49 |
| 1,764,627 | 6/1930 | Heintz | 105/49 X |
| 1,872,798 | 8/1932 | Oelkers | 105/49 X |
| 1,933,651 | 11/1933 | Beltz | 105/49 |
| 2,089,825 | 8/1937 | Butler et al. | 307/145 X |
| 2,108,530 | 2/1938 | Ellis et al. | 361/217 |
| 2,396,848 | 3/1946 | Haushalter | 361/217 X |
| 2,417,079 | 3/1947 | Kavanaugh | 361/212 X |
| 2,838,694 | 6/1958 | Hider | 307/145 |
| 3,317,759 | 5/1967 | Grobel | 307/145 |
| 3,981,611 | 9/1976 | Jensen | 307/145 X |
| 4,216,521 | 8/1980 | Merola | 361/212 X |
| 4,231,319 | 11/1980 | Waibel et al. | 361/212 X |
| 4,287,551 | 9/1981 | Watanabe | 307/145 X |
| 4,293,889 | 10/1981 | Watanabe | 307/145 X |

FOREIGN PATENT DOCUMENTS 59-209001 of 1984 Japan.
60-30828 of 1985 Japan.

Primary Examiner—William M. Shoop, Jr.
Assistant Examiner—Paul Ip
Attorney, Agent, or Firm—Wolf, Greenfield & Sacks

[57] ABSTRACT

An earthed circuit for an electric railway car which is equipped with an electric circuit including an electrical apparatus for which a switching operation is performed by use of a power semiconductor device includes a first brush attached to one of the axles of the car for connecting a return circuit for the electric circuit to the ground and a second brush attached to the same axle to which the first brush is attached for connecting the car body and a box for holding the electrical apparatus to the ground. The noise current caused by the switching operation of the power semiconductor device can be effectively prevented from flowing into the rails on which the car is running.

14 Claims, 6 Drawing Sheets

Ordinate : Current, 100 amp/scale
Abscissa : Time, mille-second/scale

Fig. 4

Ordinate : Voltag, 50 volt/scale
Abscissa : Time, 100 micro-sec/scale

EARTHED CIRCUIT FOR AN ELECTRIC RAILWAY CAR

BACKGROUND OF THE INVENTION

(1) Field of the Invention

The present invention relates to an earthed circuit for an electric railway car and, in particular, to an earthed circuit adapted to prevent a noise current from flowing into rails through both a first axle by means of which an electric circuit for the car is connected to the ground and a second axle by means of which a car body and a box holding an electrical apparatus are connected to the ground, and from adversely affecting any signalling system or the like coupled to the rails, the noise current being induced by an A.C. noise voltage generated at the occurrence of the switching operation of a power semiconductor device due to stray capacitances between the electric circuit and the box and between the electric circuit and the car body.

(2) Prior Art

Figure 1:
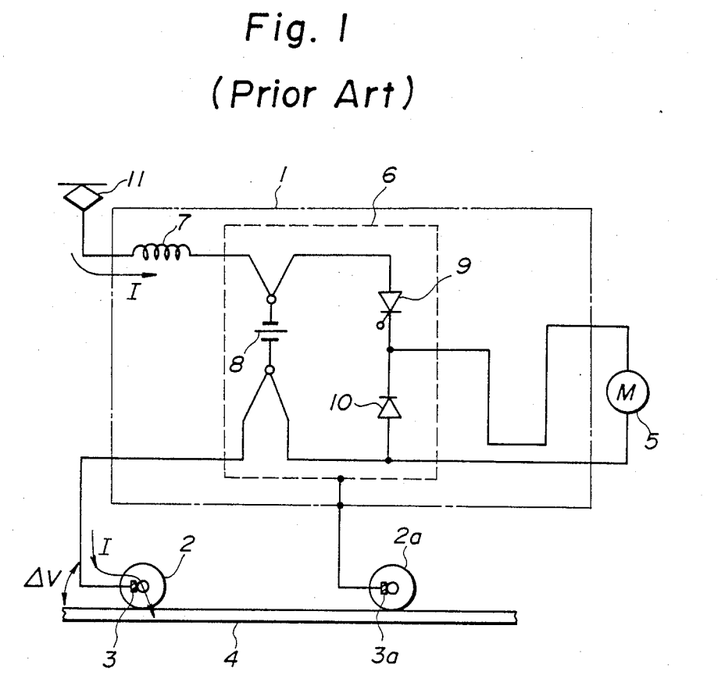
FIG. 1 is a circuit diagram showing an earthed circuit for an electric railway car according to a prior art.

The earthed circuit for an electric railway car according to a prior art is shown in FIG. 1. In the drawing, numeral 1 designates a car body, numerals 2 and 2a designate axles (or wheels), numerals 3 and 3a designate respectively first and second earthing brushes which are attached respectively to the axles 2 and 2a, numeral 4 designates a rail, numeral 5 designates a main electric motor, numeral 6 designates a box holding an electrical apparatus provided in the car, such as a chopper control unit or the like, numeral 7 designates a filter reactor, numeral 8 designates a filter capacitor, numeral 9 designates a power switching element which may be a power semiconductor device such as a GTO (Gate Turn-off Thyristor) for the chopper control unit, numeral 10 designates a free-wheeling diode, and numeral 11 designates a pantograph. According to the earthed circuit in accordance with the prior art, the first earthing brush 3 for a return circuit for the electrical circuit through which the electric current I flows and the second earthing brush 3a adapted to ground the car body 1 and the box 6 are made independent and are separately attached to the different axles 2 and 2a with interconnection accordingly being made. This arrangement has been made because it is not desirable to make the earthed point for the car body 1 and the earthed point for the return circuit common, since a voltage drop ΔV is caused due to the passage of an electric current between the first earthing brush 3 through which the electric current I flows and the axle 2. Namely, the earthing of the car body 1 and the holding box 6 may be made stable because they are connected to the same potential as the rail 4 through the axle 2a and the second earthing brush 3a and are so designed that they are not affected by the voltage drop ΔV caused in the first brush 3 by the electric current I flow in the return circuit.

Since the conventional earthed circuit for an electric railway car has been constituted in the manner described above, there has been a problem in that no account has been taken of the high frequency noise currents that are generated in the electric circuit for the car and which flow through the stray capacitance between the electric circuit and the car body 1 and the holding box 6 to the second brush 3a for connecting the car body and the box to the ground, and then through the rail 4 to the first brush 3 connected to the return circuit for the electric circuit. It is to be noted in particular that since a very fast switching speed is employed in the power control units or chopper control units of recent design which incorporate a GTO (Gate Turn-off Thyristor) and an FET (Field Effect Transistor), noises having high frequencies in the band of 100 KHz–1 MHz are likely to be generated and even a slight stray capacitance shows a tendency to generate a noise current in the form of a large spike, thereby increasing the influence on equipment installed on the ground or at a station, such as signalling systems and the like. This problem has become critical.

Figure 2:
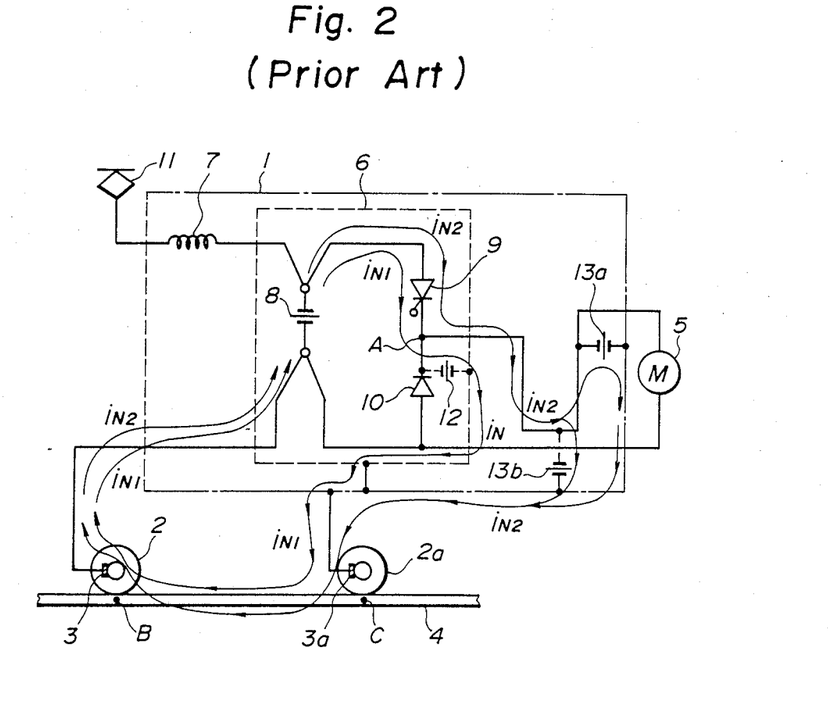
FIG. 2 is an explanatory drawing for the paths of the noise current in the earthed circuit shown in FIG. 1 for the purpose of explaining the operation of the circuit.

Some additional explanation will be given below with respect to the problems inherent with the prior art earthed circuit. In FIG. 2 is shown the noise current which flows through the earthed circuit shown in FIG. 1. In FIG. 2, the items indicated by numerals 1 through 11 are identical to those used in FIG. 1. Numeral 12 shown by a dotted line designates a stray capacitance between the electrical circuit and the holding box 6 while numerals 13a and 13b designate stray capacitances between the electrical circuit and the car body 1. An arrow $i_{N1}$ designates a noise current which flows through the stray capacitance 12 while an arrow $i_{N2}$ designates a noise current which flows through the stray capacitances 13a and 13b. In FIG. 2, the potential or voltage at, for instance, a point A will be varied in a stepped manner. For this reason, pulsed noise currents $i_{N1}$ and $i_{N2}$ are caused to flow to the holding box 6 and the car body 1 from the electric conductors and the leads contained in the electrical circuit which are at the level of the potential at the point A through the stray capacitance 12 between them and the holding box 6 and the stray capacitances 13 and 13b between them and the car body 1. Such noise currents $i_{N1}$, $i_{N2}$ having a high frequency are caused to flow out of the filter capacitor 8 with which the car is equipped and to return thereto through the earthed circuit. Namely, there are two paths taken by the noise currents, one being for the noise current $i_{N1}$ which flows through the stray capacitance 12, the holding box 6 and the car body 1, and then the second brush 3a, the axle 2a, the rail 4, the axle 2, the first brush 3 and the earthed terminal of the filter capacitor 8, while the other is for the noise current $i_{N2}$ which flows from the supposed leads to the car body 1 through each of the stray capacitances 13a and 13b, thereafter taking the same path as that of the noise current $i_{N1}$ and finally circulating back to the filter capacitor 8.

Figure 3:
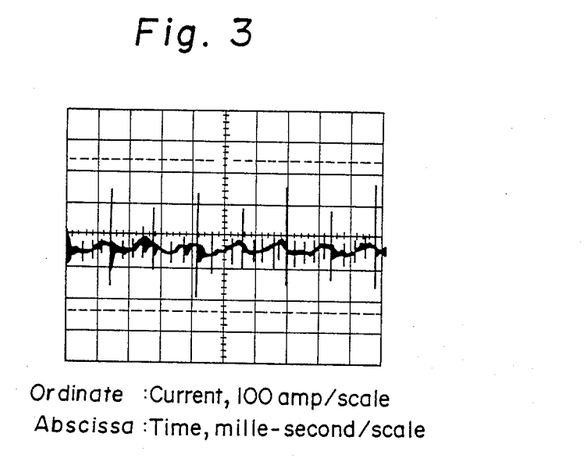
FIG. 3 is a waveform diagram showing an example of actual measurement of a noise current of spike form which flows into the rail shown in FIG. 1.
Figure 4:
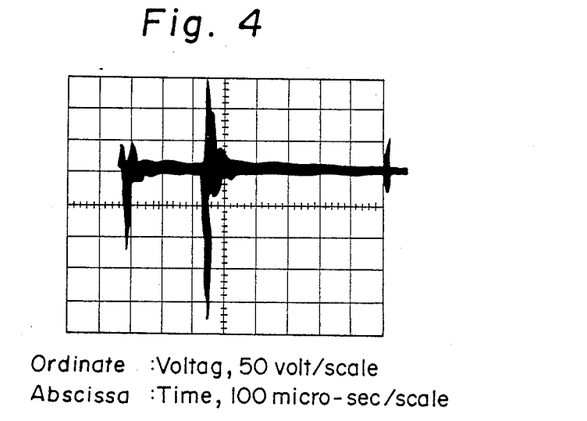
FIG. 4 is a waveform diagram showing an example of actual measurement of noise voltage generated between the opposite ends of the rail shown in FIG. 1.

FIG. 3 indicates an example of actual measurement of the noise current which flows through the rail 4 in the manner mentioned above, this measurement having been carried out in conditions equivalent to those of an actual railway car. It is to be noted that a spike-shaped noise current having crest values ranging from 100 A to 200 A has been observed in synchronization with the switching operation of the power switching element 9, which may be a power semiconductor device. Further, FIG. 4 shows an example of actual measurement of the spike voltage between points B and C on the rail 4 shown in FIG. 2, this spike voltage having been induced by the noise current. The drawing shows the width of the pulse by enlarging the abscissa which represents time. According to this illustration, the voltage having abrupt and high spikes has a high order of frequencies such as approx. 1 MHz followed by approx. 100 KHz of the oscillating voltage.

In this way, if the noise current flows to the rail 4 through the axles 2a and 2, the signalling system (not shown) electrically coupled to the rail 4 and the system (not shown) which is installed on the ground or station to provide a signal current to the rail 4 may be adversely affected such as to produce erroneous operation or non-operability. Thus a serious situation may occur leading to the electric railway car itself being prevented from running.

SUMMARY OF THE INVENTION

The disadvantages or problems described above can be overcome by the present invention.

It is an object of the present invention, therefore, to provide an improved earthed circuit for an electric railway car which is adapted to prevent noise currents caused by an electric circuit in the car from flowing into rails and from adversely affecting signalling systems or the like which are installed on the ground or at a station being approached by the car.

Another object of the present invention, which has been effected in the light of the results of investigation and experiment confirming the fact that a noise current caused by an electric circuit in the car flows to rails through an axle by means of which a car body is connected to the ground and through another axle to which a return circuit for the electric circuit is connected, is to provide an earthed circuit for an electric railway car wherein both a first brush for the return circuit and a second brush for connecting a car body and a box holding an electrical apparatus to the ground are attached to a common axle and are connected to the electric circuit in the car.

Another object of the present invention is to provide an earthed circuit for an electric railway car which is equipped with an electric circuit including an electrical apparatus for which a switching operation is performed by use of a power semiconductor device, which includes a first brush attached to at least one of the axles of the car for connecting a return circuit for the electric circuit to the ground and a second brush attached to the same brush to which the first brush is attached, for connecting both a box for holding the electrical apparatus and the car body.

According to the present invention as described above, since the first brush for connecting the return circuit for the electric circuit to the ground and the second brush for connecting the box holding the electrical apparatus and the car body to the ground are attached to the same axle of the car, and the electric circuit is connected to each of the first and second brushes, any high frequency noise current generated in the electric circuit can be effectively prevented from flowing into the rail without involving any substantial increase in terms of the cost of the system in question.

PREFERRED EMBODIMENTS OF THE INVENTION

Figure 5:
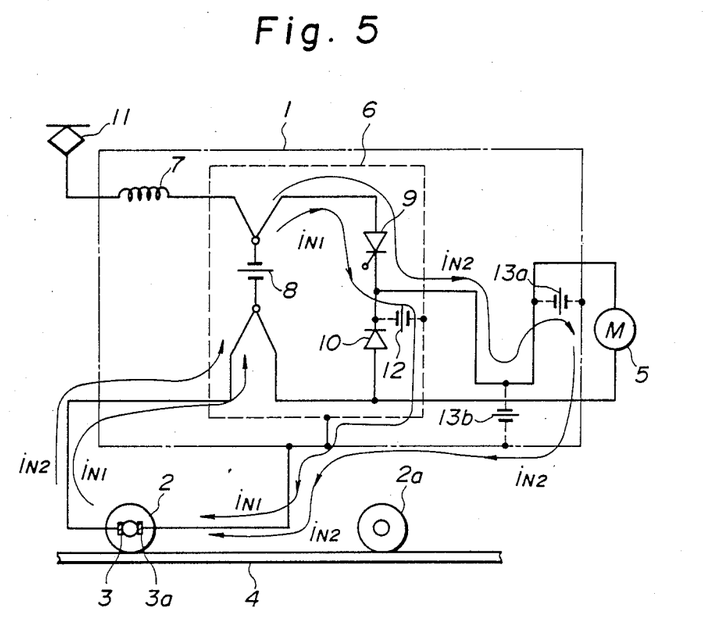
FIG. 5 is a circuit diagram showing one embodiment of an earthed circuit for an electric railway car according to the present invention.

Referring now to FIG. 5, there is shown an earthed circuit for an electric railway car of one embodiment of the present invention. The difference between FIG. 5 and FIGS. 1 and 2, each of which shows the earthed circuit according to prior art, is that the first brush 3 for the return circuit and the second brush 3a for connecting the car body 1 and the holding box 6 to the ground are attached to one of the axles, or the same axle 2, and are connected to the electric circuit for the car. By adopting this arrangement, it is possible to prevent the noise current caused by the electrical apparatus with which the car is equipped from flowing into the rail 4 while continuing to meet the fundamental requirements for the earthing of the car, that is, keeping the potential at the car body 1 free of the return current to the electrical apparatus. In other words, it was impossible in the prior art for the brush for the return circuit for the electric circuit in the car and the brush for connecting the car body to the ground to be provided on a single axle in common because a potential difference exists between the brush attached to the axle and the axle itself—which is caused by the contacting resistance therebetween—and the brush and the axle may be mechanically separated in a moment. Therefore, in the earthed circuit according to the prior art, it was essential for the brushes to be prepared separately and attached to different axles. As a results, the noise current flowed between the brushes through the rail. According to the earthed circuit of the present invention, however, although two brushes are provided, one being for the return circuit and the other being for connecting the car body to the ground, these brushes are attached to the same axle.

Figure 6:
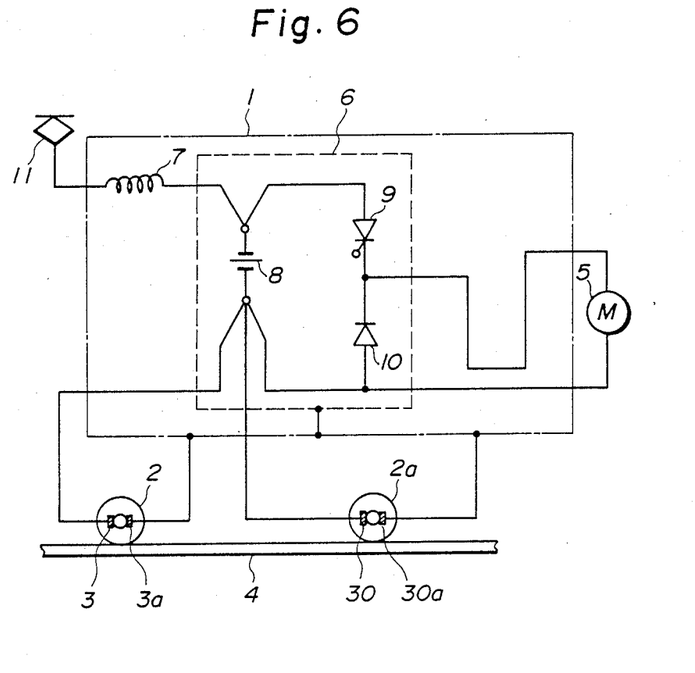
FIG. 6 is a circuit diagram showing a second embodiment of the earthed circuit of the present invention.

FIG. 6 shows an earthed circuit of a second embodiment of the present invention. This embodiment is effective in a case where the first brush 3 attached to the axle 2 is short of capacity with respect to the earthing for the return circuit. In this embodiment a third brush 30 for the return circuit and a fourth brush 30a for connecting the car body 1 and the holding box 6 are provided on the axle 2a and are also connected to the electric circuit. Through this provision, the noise current which flows into the rail 4 can be minimized.

Figure 7:
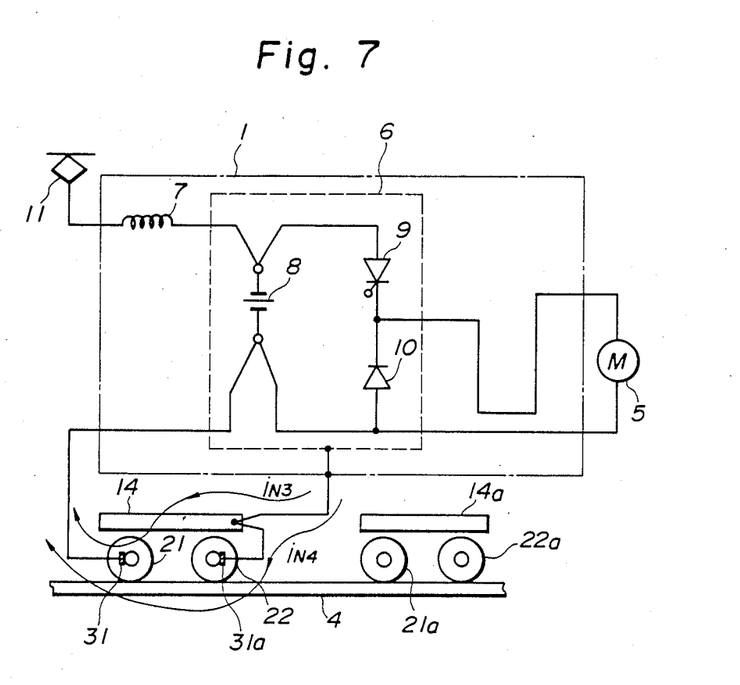
FIG. 7 is a circuit diagram showing a third embodiment of the earthed circuit of the present invention.

FIG. 7 shows an earthed circuit of a third embodiment of the present invention. This embodiment is effective in a case where the first brush for the return circuit and the second brush for connecting the car body 1 and the holding box 6 to the ground cannot be attached to one axle for structural or other reasons. In FIG. 7, numerals 14 and 14a designate bogies, numerals 21 and 22 designate axles (wheels) of the bogie 14, and numerals 21a and 22a designate axles (wheels) of the bogie 14a. Further, numeral 31 designates the first brush for the return circuit, which is attached to the axle 21 of the bogie 14 and numeral 31a designates the second brush for connecting the car body 1 and the holding box 6 to the ground, which are attached to the axle 22 of the bogie 14. The first and second brushes 31, 31a which are respectively attached to the axles 21, 22 provided on the bogie 14 are connected to the electric circuit for the car. Also, the car body 1 and the holding box 6 are connected to the second brush 31a through the bogie 14. Thus, the noise currents $i_{N1}$ and $i_{N2}$, as explained above, are diverted into one partial noise current $i_{N3}$ which flows from the car body 1 to the return circuit through the bogie 14, the axle 21 and the first brush 31, and the other partial noise current $i_{N4}$ which flows from the car body 1 to the return circuit through the bogie 14, the second brush 31a, the axle 22, the rail 4, the axle 21 and the first brush 31. Accordingly, the amount of noise current which flows into the rail 4 can be reduced and the length of the rail 4 through which the noise current flows is shorter, so that the influence of the noise current on the signalling system and the like installed on the ground or at a station can be kept to a minimum.

I claim:

1. An electric railway car noise signal grounding circuit which reduces the amount of noise and switching transients that are impressed on rails over which said railway car runs, said noise signal grounding circuit for use with an electric railway car which includes a car body, a drive current circuit, power switching devices in said drive current circuit for controlling drive current and a return circuit connecting said power switching devices through a contact mechanism to said rails for conducting return current to said rails, said noise signal grounding circuit comprising:
   an electrical shield surrounding said power switching device;
   connector means electrically connected to said contact mechanism for making an electrical connection to said rails; and
   means for connecting said electrical shield to said connector means so that said electrical shield is electrically connected to said rails at the same physical point as said return circuit.

2. An electric railway car noise signal grounding circuit according to claim 1 further comprising means connecting said car body to said contact mechanism so that said car body is electrically connected to said rails at the same physical point as said return circuit.

3. An electric railway car noise signal grounding circuit according to either of claims 1 and 2 wherein said contact mechanism comprises a first axle, a first railway wheel connected to said first axle and riding on said rails and first brush means electrically contacting said first axle for conducting said return current to said rails and said connector means comprises a second brush contacting said first axle for conducting a noise current to said rails at the same point as said return current.

4. An electric railway car noise signal grounding circuit according to claim 3 wherein said contact mechanism further comprises a second axle, a second railway wheel connected to said second axle and riding on said rails and third brush means electrically contacting said second axle for conducting said return current to said rails in parallel with said first brush means and said connector means further comprises a fourth brush contacting said second axle for conducting said noise current to said rails in parallel with said second brush means.

5. An electric railway car noise signal grounding circuit according to claim 4 wherein said railway car has at least one bogie comprising said first axle and said second axle.

6. An electric railway car noise signal grounding circuit according to claim 5 wherein said bogie is comprised of a truck body, said first axle and said second axle and said truck body is electrically connected to said second axle.

7. An earthed electric railway car electrical circuit which reduces the amount of noise and switching transients that are impressed on rails over which said railway car runs, said electrical circuit comprising:
   a drive current circuit;
   a traction motor;
   power switching devices in said drive current circuit for controlling drive current to said traction motor;
   a contact mechanism electrically contacting said rails for conducting return current from said traction motor to said rails;
   a electrical shield surrounding said power switching device;
   connector means electrically connected to said contact mechanism for making an electrical connection to said rails; and
   means for connecting said electrical shield to said connector means so that said electrical shield is electrically connected to said rails at the same physical points as said contact mechanism.

8. An earthed electric railway car electrical circuit according to claim 7 wherein said railway car has a car body and said electric railway car electrical circuit further comprises means connecting said car body to said contact mechanism so that said car body is electrically connected to said rails at the same physical point as said contact mechanism.

9. An earthed electric railway car electrical circuit according to either of claims 7 and 8 wherein said contact mechanism comprises a first axle, a first railway wheel connected to said first axle and riding on said rails and first brush means electrically contacting said first axle for conducting said return current to said rails and said connector means comprises a second brush contacting said first axle for conducting a noise current to said rails at the same point as said contact mechanism.

10. An earthed electric railway car electrical circuit according to claim 9 wherein said contact mechanism further comprises a second axle, a second railway wheel connected to said second axle and riding on said rails and third brush means electrically contacting said second axle for conducting said return current to said rails in parallel with said first brush means and said connector means further comprises a fourth brush contacting said second axle for conducting said noise current to said rails in parallel with said second brush means.

11. An earthed electric railway car electrical circuit according to claim 10 wherein said railway car has at least one bogie comprising said first axle and said second axle.

12. An earthed electric railway car electrical circuit according to claim 11 wherein said bogie is comprised of a truck body, said first axle and said second axle and said truck body is electrically connected to said second axle.

13. A method for reducing the amount of noise and switching transients that are impressed on rails over which an electric railway car runs, said electric railway car including a car body, a drive current circuit, power switching devices in said drive current circuit for controlling drive current, and a return circuit connecting said power switching devices through a contact mechanism to said rails for conducting return current to said rails, said method comprising the steps of:
   A. providing an electrical shield around said power switching devices, and B. connecting said electrical shield to said connector means so that said electrical shield is electrically connected to said rails at the same physical point as said return circuit.

14. A method for reducing noise and switching transients according to claim 13 further comprising the step of:

C. connecting said car body to said connector means so that said car body is electrically connected to said rails at the same physical point as said return circuit.

* * * * *